United States Patent [19]

Malizia

[11] Patent Number: 5,467,953
[45] Date of Patent: Nov. 21, 1995

[54] SUPPORTING STAND FOR A MUSICAL INSTRUMENT KEYBOARD

[76] Inventor: Mario Malizia, Via Berardi 19, 60022 Castelfidardo (AN), Italy

[21] Appl. No.: 284,897

[22] Filed: Aug. 2, 1994

[30] Foreign Application Priority Data

Aug. 31, 1993 [DE] Germany ............................ 9313078 U

[51] Int. Cl.$^6$ ..................................................... F16M 11/00
[52] U.S. Cl. ............................ 248/166; 248/164; 74/535; 188/69; 188/82.77; 16/321
[58] Field of Search ..................................... 248/166, 434, 248/157, 164; 108/115, 118, 119, 120; 192/46; 74/535; 38/103, 104, 106, 137, DIG. 2; 188/82.3, 82.34, 82.7, 82.77, 31, 69; 16/297, 324, 322, 321

[56] References Cited

U.S. PATENT DOCUMENTS

| | | | |
|---|---|---|---|
| 1,653,764 | 12/1927 | Goodwin | 248/166 |
| 4,763,865 | 8/1988 | Danner | 248/164 |
| 4,917,341 | 4/1990 | Pirchio | 248/164 |
| 4,974,525 | 12/1990 | Sheffield | 248/164 |

FOREIGN PATENT DOCUMENTS

2243768  11/1991  United Kingdom ................... 248/166

Primary Examiner—Leslie A. Braun
Assistant Examiner—Anita M. King
Attorney, Agent, or Firm—McAulay Fisher Nissen Goldberg & Kiel

[57] ABSTRACT

A stand, in particular a stand for a musical instrument keyboard, comprises two double-T stand segments which are connected with one another so as to be swivelable out of a rest position into a working position in the manner of a pair of scissors. A locking gear mechanism is included for determining the swivel angle and, accordingly, the working height of the stand segment associated with the swivel axis of the stand segments. The locking gear mechanism has a catch member which is associated with one stand segment. The other stand segment has an associated locking member of the locking gear mechanism acting against the force of a spring. The locking gear mechanism is a directional locking gear having a locking disk with a plurality of catch notches for determining the working positions. The locking member is in the form of a catch lever which is arranged tangentially to the locking disk and engages in the catch notches in the radial direction. A ratchet member is associated with the catch lever and is supported so as to be swivelable between two stops. The catch lever is held out of engagement with the locking disk between the first and second stops via the ratchet member and is then released so as to engage in the locking disk after being moved into a first working position associated with the stop and which can be disengaged from the locking disk after occupying a final working position determined by the additional stop. In this final working position the ratchet member is dragged along by the catch lever.

6 Claims, 2 Drawing Sheets

SUPPORTING STAND FOR A MUSICAL INSTRUMENT KEYBOARD

BACKGROUND OF THE INVENTION a) Field of the Invention

The present invention is directed to a stand, in particular, a musical instrument keyboard stand, with two double-T stand segments which are connected with one another so as to be swivelable out of a rest position into a working position in the manner of a pair of scissors. A locking gear mechanism determining the swivel angle and, accordingly, the working height of the stand segment is associated with the swivel axis of the stand segments. The catch member of the locking gear mechanism is associated with one stand segment and the locking member of the locking gear mechanism acting against the force of a spring is associated with the other stand segment.

b) Background Art

Such a stand is known from U.S. Pat. No. 4,917,341, in which a handle is associated with the locking member. The locking member can be pulled out of the occupied catch hole of the catch member against the force of the spring by means of the handle in order to cancel the fixed connection between the stand segments so that the latter can be swiveled. For this purpose, the stand must be held with one hand while the other hand pulls on the handle. Thus, no hands remain free for swiveling the stand segments relative to one another into a new working position of the stand segments, so that a buttress must be found against which to support one stand segment while swiveling the other stand segment. As a rule, the user will make use of his foot in this case, which is simple when both stand segments are already swiveled out, since one foot can then be placed on one of the base parts which are fastened at the lower ends of the stand segments transversely thereto. However, when the stand is in its rest position in which the two base parts are situated adjacent to one another, this way of holding one stand segment with the foot is difficult if not impossible. Accordingly, this type of operation is complicated and the user risks injury to the hands particularly when moving the stand segments into their rest position, since the fingers of the hand grasping one stand segment can easily be pinched when unlocking the locking gear mechanism and moving the other stand segment into the rest position.

Yet, there is a great demand for such stands, which may also be used for other purposes such as for holding a table top, since such stands can be stored in a compact space when folded, but form a stable frame for supporting loads, e.g. the aforementioned musical instrument keyboard or the like.

OBJECT AND SUMMARY OF THE INVENTION

The invention therefore has, as a primary object, the further developing of such stands in such a way that they can be operated in a simpler and safer way than was previously possible.

Based on a stand of the type mentioned above, this object is met according to the invention in that the locking gear mechanism is a directional locking gear whose locking disk has a plurality of catch notches determining the working positions, while the locking member is a catch lever which is arranged tangentially to the locking disk and engages in the catch notches in the radial direction. Associated with this catch lever is a ratchet member (drag lever) which is supported so as to be swivelable between two stops, the catch lever being held out of engagement with the locking disk between the first and second stops via this ratchet member and then released so as to engage in the locking disk after being moved into the first working position associated with the stop and can be disengaged from the locking disk after occupying its final working position determined by the additional stop, in which final working position the ratchet member is dragged along by the catch lever.

According to a further feature of the invention, the locking disk is arranged concentrically to the swivel axis on the inside of a cup-shaped housing plate whose center contains the swivel axis of the stand segments and the locking member is arranged eccentrically to the swivel axis, likewise on the inside of an identically constructed cup-shaped housing plate whose center contains the swivel axis of the stand segments, wherein each housing plate is fastened by its outer surface to a stand segment and the two housing plates embrace one another so as to enclose the directional locking gear.

Due to the construction of the stand according to the invention, it is possible, without actuating a handle and solely by means of moving the stand members, to move the stand members out of their rest position into the desired working positions defined by the catch notches of the locking disk as soon as the directional locking gear is unlocked after passing the first working position and, after the stand segments have been moved into the final working position, to move these stand segments into their initial rest position. Thus, such a construction makes it possible to move the stand out of the rest position into the desired working position and back into the rest position from this working position with two hands in a simple manner without appreciable effort and without the risk of injuring the fingers. Further, an attractive appearance is achieved, since all structural component parts of the directional locking gear are enclosed by the housing plates.

The invention is described in the following with reference to an embodiment example shown more or less schematically in the drawing.

DESCRIPTION OF THE PREFERRED EMBODIMENTS

Figure 1:
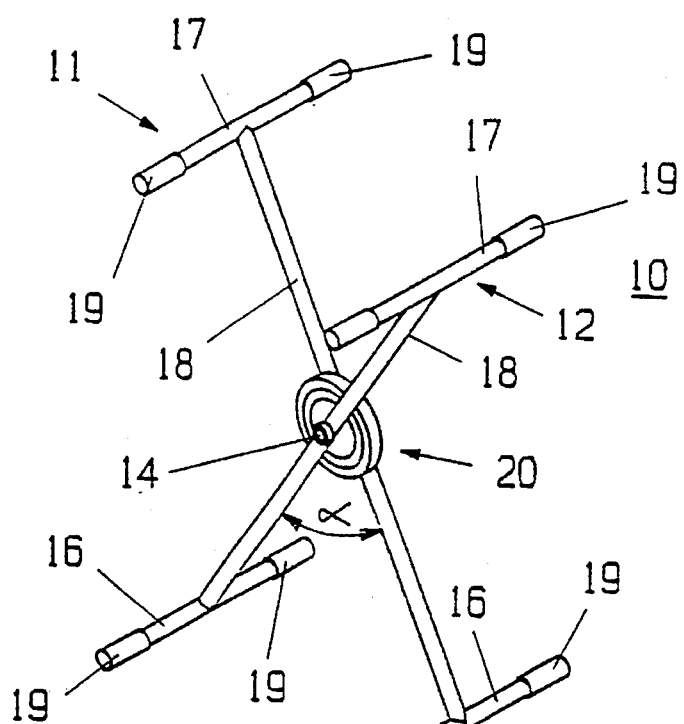
FIG. 1 shows a perspective view of a stand, according to the invention, in a working position.

A stand, designated in its entirety by 10 in FIG. 1, has two identically constructed double-T stand segments 11 and 12 which can be swiveled in the manner of scissors around a center axis 14.

Each stand segment has a base part 16 and a supporting part 17 which are securely connected with one another via a center piece 18. The ends of the base parts and supporting parts are provided with a non-slip coating or covering 19.

The stand segments described above are produced from a metal tube with a round or square cross section having a suitable thickness for the load to be received.

Figure 4:
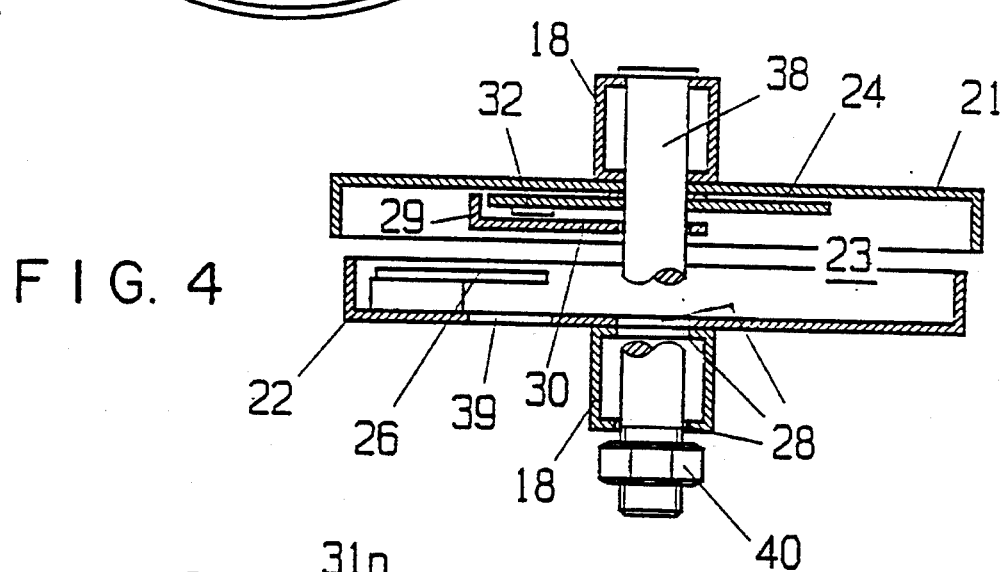
FIG. 4 shows an exploded view of the directional locking gear, in section.

A directional locking gear 20 providing for the swivelable connection of the stand segments is arranged centrically to the axis 14 and is enclosed by two cup-shaped housing plates 21 and 22 which are securely connected by their outer sides respectively with a center piece of each stand segment 11 and 12 (cf. FIG. 4). In the assembled state according to FIG. 1, the two housing plates cover one another and enclose an interior space 23 in which is arranged the directional locking gear which will be described in the following.

Figure 2:
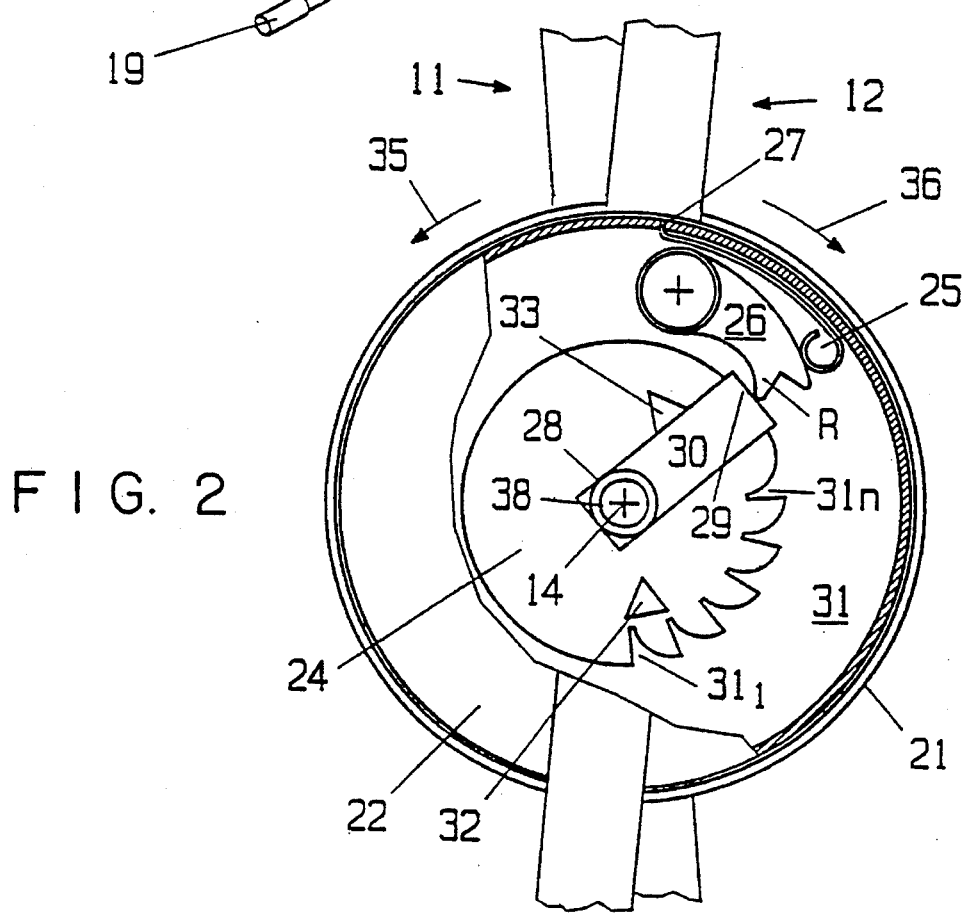
FIG. 2 is a top view of the directional locking gear associated with the stand according to FIG. 1 in a rest position, wherein a housing half is shown in a partial cutaway view.
Figure 3:
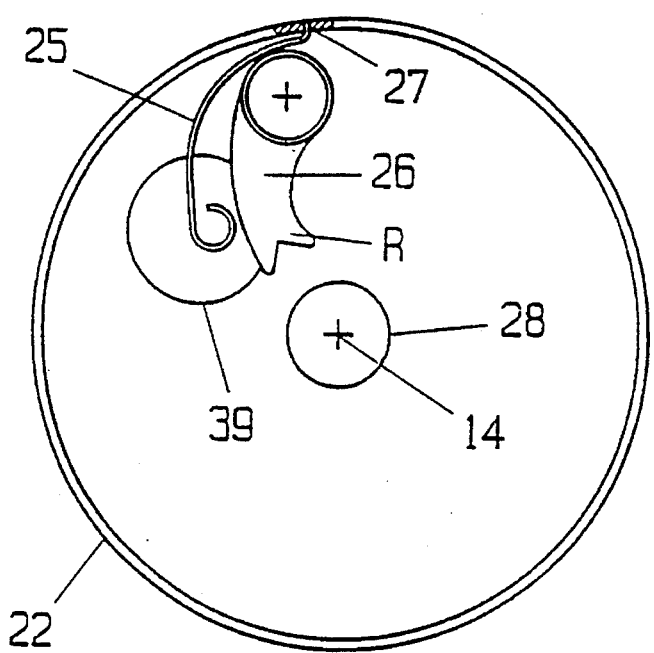
FIG. 3 shows a top view of the other housing half of the directional locking gear associated with the stand according to FIG. 1.

As is shown in FIGS. 2 to 5, the directional locking gear 20 has a locking disk 24 associated with the housing plate 21 and a catch lever 26 which is associated with the housing plate 22 and is acted upon by a spring 25 supported in an opening 27 of the housing plate 22. As shown in FIGS. 2 and 4 in particular, the locking disk 24 is arranged concentrically to the swivel axis 14 and secured on the inside of the housing plate 21, while the catch lever 26 is arranged so as to be offset eccentrically to the swivel axis 14, i.e. tangentially to the locking disk 24, so as to be stationary but swivelable on the inside of the plate 22 and is acted upon by the force of the spring 25. The catch lever 26 has a claw-shaped catch R opposite the point of application of the spring.

The locking disk 24 has catch notches $31_1$ to $31_n$ arranged at its circumference at regular or irregularly spaced angular intervals. In cooperation with the catch lever, the catch notches $31_1$ to $31_n$ define the respective opening angle α of the stand segments 11 and 12 and, consequently, the standing height of the supporting parts above the ground on which the base parts rest. The catch notches $31_n$ to $31_n$ and the catch are designed in such a way that the catch R engages in the catch notches $31_1$ to $31_n$ and securely locks the directional locking gear in one movement direction when engaged.

Further, a drag lever 30 provided with a bent portion 29 is associated with the locking disk 24 and is likewise supported on the swivel axis 14 so as to be rotatable, its movement being defined by stops 32 and 33. A position of the catch lever and locking disk corresponding to the rest position of the stand, in which the stand segments 11 and 12 lie approximately parallel to one another, is shown in FIG. 2.

Figure 5:
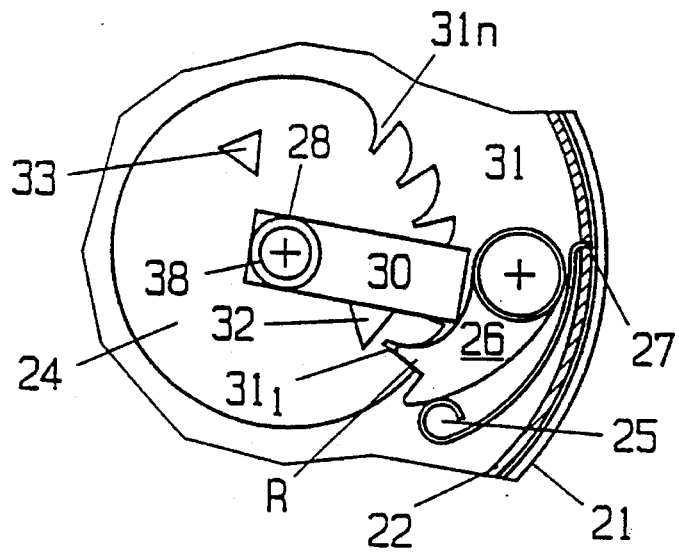
FIG. 5 shows a section of a top view of the directional locking gear associated with the stand according to FIG. 1.

When the stand segments 11 and 12 are moved out of their rest position in the direction of arrows 35 and 36, the drag lever 30 is first carried along in the direction of arrow 36 by the catch lever 26 until the drag lever 30 is arrested by the stop 32 so that, as the movement of the stand segments 11 and 12 continues, the catch R of the catch lever 26 slides over the bent portion 29 and locks in the first catch notch $31_1$ of the locking disk 24 corresponding to the lowest working position of the stand as can be seen from FIG. 5.

The aforementioned stop 32 is adjacent to the first catch notch $31_1$; the two stops 32 and 33 are welded onto the locking disk 24 at an angular distance of roughly 90° from one another.

As the stand segments are subsequently moved in the direction opposite to arrows 35 and 36, they occupy the respective angular positions defined by the catch notches $31_1$ to $31_n$ in cooperation with the catch lever 26 and accordingly assume the different possible working positions.

The swivel axis 14 is embodied by a bearing pin 38 which is fastened in the center of the housing plate 21 of the stand segment 11 and projects through a centric opening 28 in the housing plate 22 of stand segment 12 in the assembled state according to FIG. 1 so as to receive a nut 40 securing the stand segments and the directional locking gear described above (cf. FIG. 4). The housing plate 22 further has an assembly opening 39 so that the catch lever 26 can be swiveled against the force of the spring 25 when mounted from the outside.

In order to move the above-described stand out of its rest position, shown in FIG. 2, into the working position shown in FIG. 1, it is advisable to grasp each head part 16 of the stand segments 11 and 12 with one hand and move them apart in the direction of arrows 35 and 36 until the drag lever 30 which is dragged by the catch lever and is rotatable on the bearing pin 38 makes contact with the stop 32 so that the catch lever 26 is released for engaging in the catch notch $31_1$ when the stand segments are moved further apart. As a result of the continued movement of the stand segments 11 and 12 in the direction of arrows 35 and 36 and the relative movement of the locking disk 24 and catch lever 26 which is effected in so doing, the catch lever 26 reaches the first catch notch $31_1$ located on the circumference of the locking disk 24. The catch R now engages in the first catch notch $31_1$ under the influence of the spring 25 and accordingly locks the stand segments in the angular position α assumed by them.

If this angular position does not meet the needs of the user, one of the following catch notches 31 can be reached by moving the stand segments opposite the direction of arrows 35 and 36 so that the catch R of the catch lever 26 engages in this catch notch 31 and locks the stand segments. In so doing, the catch lever 26 drags the drag lever 30 back in the direction of the stop 33 with the rear of the catch R and the catch R catches in each of the following catch notches 31 of the locking disk 24.

In order to move the stand segments back into their rest position in which they are approximately parallel to one another, the stand segments must be moved in the direction of arrows 35 and 36 to the last catch notch $31_n$. In so doing, the drag lever 30 contacts the stop 33 and the catch R of the catch lever 26 slides on the bent portion 29 of the drag lever 30 so that the catch lever 26 is moved into its inactive position, since the drag lever 30 contacts the stop 33 which prevents further swiveling of the drag lever 30. In this case, the stand segments have assumed their rest position.

A desired working position can be adjusted again by moving the stand segments in the opposite direction into the releasing position, namely in the direction of arrows 35 and 36, until the lever 30 contacts the stop 32 so that the catch lever moves over the bent portion 29 and engages with the first catch notch $31_1$ of the locking disk 24 under the influence of the spring 25.

As a result of the lever action of the center pieces 18 of the stand segments and the selected curved shape of the catch notches, the spring forces acting on the directional locking gear are easily overcome, which is of great convenience for the user. On the other hand, the construction of the catch lever and the curved shape of the catch notches ensure a reliable locking of the stand segments in the respective adjusted position. For this purpose, the curved shape of the catch R of the catch lever 26 corresponds to the curved shape of the catch notches.

The bent portion 29 on which the catch R of the catch lever 26 slides must be dimensioned in such a way that the latter remains on the bent portion while the stand segments are being moved into the rest position—after the drag lever 30 contacts the stop 33—until the rest position of the stand segments is achieved, since operation would not otherwise be possible.

The stand described above is particularly advantageous when used as a so-called musical instrument keyboard stand (single- or multiple-tier) and for all types of musical instrument stands as well as for other purposes, e.g. for tables, seats, merchandise stands, clothing drying racks, etc.

While the foregoing description and drawings represent the preferred embodiments of the present invention, it will be obvious to those skilled in the art that various changes and modifications may be made therein without departing from the true spirit and scope of the present invention.

What is claimed is:

1. A stand for a musical instrument keyboard, comprising:
   two double-T stand segments which are connected with one another so as to be swivelable out of a rest position into a working position in the manner of a pair of scissors;
   a locking gear mechanism for determining a swivel angle and, accordingly, a working height of stand segment associated with the swivel axis of the stand segments;
   said locking gear mechanism having a catch member which is associated with one stand segment and the other stand segment having an associated locking member of the locking gear mechanism acting against force of a spring;
   said locking gear mechanism having a directional locking gear having a locking disk with a plurality of catch notches for determining working positions;
   said locking member being in the form of a catch lever which is arranged tangentially to the locking disk and engages in the catch notches in the radial direction;
   a ratchet member being associated with said catch lever and being supported so as to be swivelable between a first and second stop;
   said catch lever being held out of engagement with the locking disk between the first and second stops via said ratchet member and then being released so as to engage in said locking disk after being moved into a first working position associated with the first stop and which can be disengaged from said locking disk after occupying a final working position determined by the second stop, in which final working position said ratchet member is dragged along by the catch lever.

2. The stand according to claim 1, wherein said locking disk is arranged concentrically to the swivel axis on the inside of a first cup-shaped housing plate whose center contains the swivel axis of the stand segments and said locking member is arranged eccentrically to the swivel axis, likewise on the inside of a second cup-shaped housing plate of identical construction, whose center contains the swivel axis of the stand segments, wherein each housing plate is fastened by its outer surface to a stand segment, and wherein the two housing plates embrace one another so as to enclose the directional locking gear.

3. The stand according to claim 1, wherein the stops first and second for the drag lever, ratchet members which brings the catch lever out of engagement with the locking disk and is supported on the swivel axis, are arranged on the side of the locking disk facing the drag lever ratchet member and are at an angular distance of approximately 90° from one another.

4. The stand according to claim 1, wherein the swivel axis is a bearing pin which is securely connected with a first housing plate, a second housing plate being supported on the bearing pin so as to be swivelable and held by a retaining element.

5. The stand according to claim 1, wherein the spring acting upon the catch lever is held by its free end in an opening of a first housing plate.

6. The stand according to claim 4, wherein the first housing plate supports the catch lever and has an assembly opening.

* * * * *